US007377953B2

(12) United States Patent
Oh

(10) Patent No.: US 7,377,953 B2
(45) Date of Patent: May 27, 2008

(54) CYCLONE DUST COLLECTING APPARATUS HAVING CONTAMINANTS COUNTERFLOW PREVENTION MEMBER

(75) Inventor: Jang-keun Oh, Gwangju (KR)

(73) Assignee: Samsung Gwangju Electronics Co., Ltd., Gwangju (KR)

( * ) Notice: Subject to any disclaimer, the term of this patent is extended or adjusted under 35 U.S.C. 154(b) by 599 days.

(21) Appl. No.: 11/130,960

(22) Filed: May 17, 2005

(65) Prior Publication Data

US 2006/0168922 A1 Aug. 3, 2006

(30) Foreign Application Priority Data

Jan. 31, 2005 (KR) ...................... 10-2005-0008714

(51) Int. Cl.
*B01D 45/12* (2006.01)

(52) U.S. Cl. ......................... 55/426; 55/429; 55/459.1; 55/DIG. 3

(58) Field of Classification Search .................. 55/343, 55/426, 429, 459.1, DIG. 3; 15/350, 353
See application file for complete search history.

(56) References Cited

U.S. PATENT DOCUMENTS 7,022,154 B2 * 4/2006 Oh .............................. 55/426
2003/0213091 A1 11/2003 Oh et al.
2004/0103785 A1 6/2004 North
2004/0187253 A1 9/2004 Jin et al.

FOREIGN PATENT DOCUMENTS

| | | |
|---|---|---|
| CN | 1459274 | 3/2003 |
| KR | 10-2002 0085478 | 11/2002 |
| KR | 1020020085478 | 11/2002 |
| KR | 10-2003 0056777 | 7/2003 |
| KR | 1020030056777 | 7/2003 |
| WO | WO2004/030508 | 4/2004 |

* cited by examiner

*Primary Examiner*—Robert A Hopkins
(74) *Attorney, Agent, or Firm*—Ladas & Parry LLP

(57) ABSTRACT

A cyclone dust collecting apparatus comprises a deformable contaminants counterflow prevention member mounted to within 10 to 12 mm of the inner surface of the cyclone dust collecting apparatus. The deformable contaminants counterflow prevention member is soft enough to be elastically transformed to allow large contaminants to be drawn past it and drop into a dust collecting apparatus yet resilient enough so that it returns to its original shape after a large contaminant is passed.

6 Claims, 4 Drawing Sheets

CYCLONE DUST COLLECTING APPARATUS HAVING CONTAMINANTS COUNTERFLOW PREVENTION MEMBER

CROSS-REFERENCE TO RELATED APPLICATIONS

This application claims the benefit of Korean Patent Application No. 2005-8714 filed on Jan. 31, 2005, in the Korean Intellectual Property Office, the disclosure of which is incorporated herein by reference in its entirety.

FIELD OF THE INVENTION

The present invention relates to a vacuum cleaner. More particularly, the present invention relates to a cyclone dust collecting apparatus having a contaminants counterflow prevention member which can improve efficiency of separation of contaminants

BACKGROUND OF THE INVENTION

Generally, a cyclone dust separating apparatus, also known as a cyclone dust collecting apparatus, draws in contaminant-laden air from a surface by negative air pressure generated by a vacuum source in a vacuum cleaner body. As air flows through a cyclone dust collecting apparatus, the air generates a rotating or cyclonic air stream or vortex in the cyclone dust separating apparatus that causes suspended dirt particles to be centrifugally separated from the air.

FIG. 1 is a schematic view of cyclone dust collecting apparatus for a vacuum cleaner. Reference numerals 1, 2 denote a cyclone dust collecting apparatus and a cleaner body, respectively. Reference numerals 10, 20 and 30 denote a cyclone body, a contaminants-collecting receptacle and a grill, respectively.

As shown in FIG. 1, the cyclone body 10 comprises an air intake port, also referred to herein as an inflow port 11 and an air outlet or exhaust port, referred to herein as an air outflow port 12. The air inflow port 11 is connected with an air path or duct 3 that is fluidly communicated with an inlet of a suction brush (not shown) of the cleaner body 2 when the cyclone dust collecting apparatus 1 is mounted to the cleaner body 2. The air outflow port 12 is connected with an air discharging port (not shown) at an upside of the cyclone body 10. The air outflow port 12 is connected with an air discharging path fluidly communicated with a motor-driven vacuum source in a motor chamber 5 in the cleaner body 2.

Dust and contaminant-laden air flowing into a vacuum cleaner via the suction brush streams into the cyclone body 10 through the air inflow path 3 and the air inflow port 11 of the cleaner body 2, tangentially to the cyclone body wall. Because the air flows in tangentially, a rotating stream, which is also known as a cyclone or vortex, is generated in the cyclone body 10. Dust and contaminants are separated from the rotating stream by a centrifugal force, cleaned air is discharged to the outside through the air outflow port 12, and an air discharge path 4 and the motor driving chamber 5 of the cleaner body 2.

The contaminant collection receptacle 20 is detachably engaged with a bottom portion of the cyclone body 10 and collects dust and contaminants centrifugally separated from air by a rotating stream in the cyclone body 10.

A grill 30 is mounted at an entrance of the air outflow port 12 in the cyclone body 10 to prevent the separated dust and contaminants from counterflow to the cleaner body 10 through the air outlet port 12. The grill 30 comprises a grill body 31, a plurality of paths 32 arranged around the outer circumference of the grill body 31 to fluidly communicate with the air outflow port 12 and a counterflow prevention port 33, a function of which is to prevent collected contaminants from counterflowing and escaping the cyclone dust collecting apparatus 10.

The efficiency of a cyclone dust collecting apparatus depends in part on the distance d between the counterflow prevention part 33 and the cyclone body 10. That is, if an end of the counterflow prevention part 33 is arranged to be close to an inner circumference of the cyclone dust collecting apparatus, filtering effectiveness can be improved because it can prevent contaminants collected in the contaminants collection receptacle 20 from counterflow. However, large contaminants are sometimes trapped or caught such that they may obstruct generation of rotating stream or block the air discharge path.

On the other hand, if the counterflow prevention part 33 is arranged too far from the inner circumference of the cyclone body 10, large contaminants can be easily collected in the contaminants collection receptacle 20, however, large contaminants collected in the contaminants collection receptacle 20 may be affected by the rotating stream in the cyclone body 10 such that they counterflow from a bottom surface of the contaminants collection receptacle 20 and are trapped or caught by the grill 30, and as a result, dirt collection of the cyclone dust collecting apparatus 1 may decrease.

SUMMARY OF THE INVENTION

The present invention has been conceived to solve at least the above-mentioned problems in the prior art, and an aspect of the present invention is to provide a cyclone dust collecting apparatus having an improved contaminants counterflow prevention member, which can prevent collected contaminants from counterflowing but which allows large contaminants into a contaminants to pass around it to be collected into a collection receptacle.

In order to achieve the above aspects, there is provided a cyclone dust separating apparatus having a cyclone body and a grill mounted in the cyclone body that prevents dusts and contaminants that are centrifugally separated in a rotating stream, from leaking out of the cyclone body. The preferred embodiment of the cyclone dust collecting apparatus provides an improved contaminants counterflow prevention member engaged with a bottom surface of the grill that prevents centrifugally separated contaminants from counterflowing yet allows large objects to pass around it for collection into a containment receptacle. A contaminants collection receptacle collects the centrifugally separated contaminants, wherein the contaminants counterflow prevention member is made of elastically transformable material.

The contaminants counterflow prevention member may be made of a rubber material of 40 Shore hardness degrees (40 A) and below.

In the preferred embodiment, the separation distance between the contaminants counterflow prevention member and the inner circumference of the cyclone body is preferably between 10 and 12 mm although the separation distance may be as small as 6 mm and as large as 20 mm, depending on the diameter of the cyclone body and the depth or strength of the vacuum provided by a vacuum source. The separation distance between the contaminants counterflow prevention member and the contaminants collection receptacle may be between 8 and 10 mm.

The contaminants counterflow prevention member is of a material that is sufficiently pliable at normal operating temperatures such that it will deform and allow objects greater in size than the separation distance between the contaminants counterflow prevention member and the inner circumference of the cyclone body to pass around the counterflow prevention member when the contaminants are being pulled the apparatus by air current drawn through the cyclone dust collecting apparatus by a vacuum source that is coupled to the cyclone dust collecting apparatus.

A protrusion part at a lower end part of the filter enagages the contaminants counterflow prevention member and a groove configured at a position corresponding to the protrusion part around the contaminants counterflow prevention member such that the groove part and the protrusion part are engaged with each other of the contaminants counterflow prevention member to be fit in the grill.

BRIEF DESCRIPTION OF THE DRAWINGS

The above and other aspects, features and advantages of the present invention will be more apparent from the following detailed description taken with reference to the accompanying drawings, in which.

DETAILED DESCRIPTION OF THE PREFERRED EMBODIMENT

Figure 1:
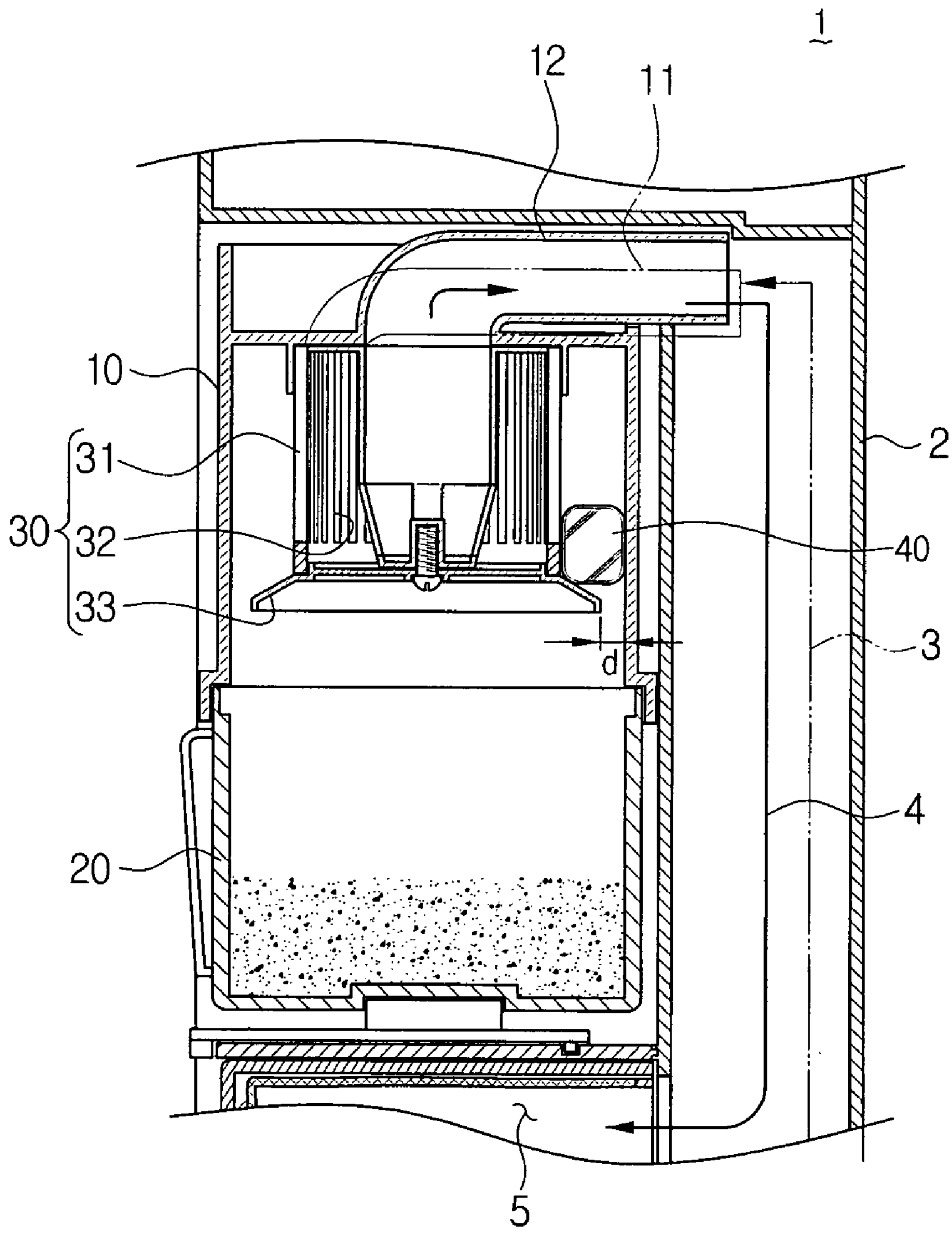
FIG. 1 (PRIOR ART)
FIG. 1 is a cross-sectional view of a prior art cyclone dust collecting apparatus.

Certain embodiments of the present invention will be described in greater detail with reference to the accompanying drawings.

In the following description, same drawing reference numerals are used for the same elements even in different drawings. The matters described in the description that follows should not be construed to be limiting but rather to assist in a comprehensive understanding of the invention. Thus, it should be understood that the claimed invention is not limited by what is described but by what is recited in the claims. Also, well-known functions or constructions are not described in detail since they would tend to obscure the invention in unnecessary detail.

Figure 2:
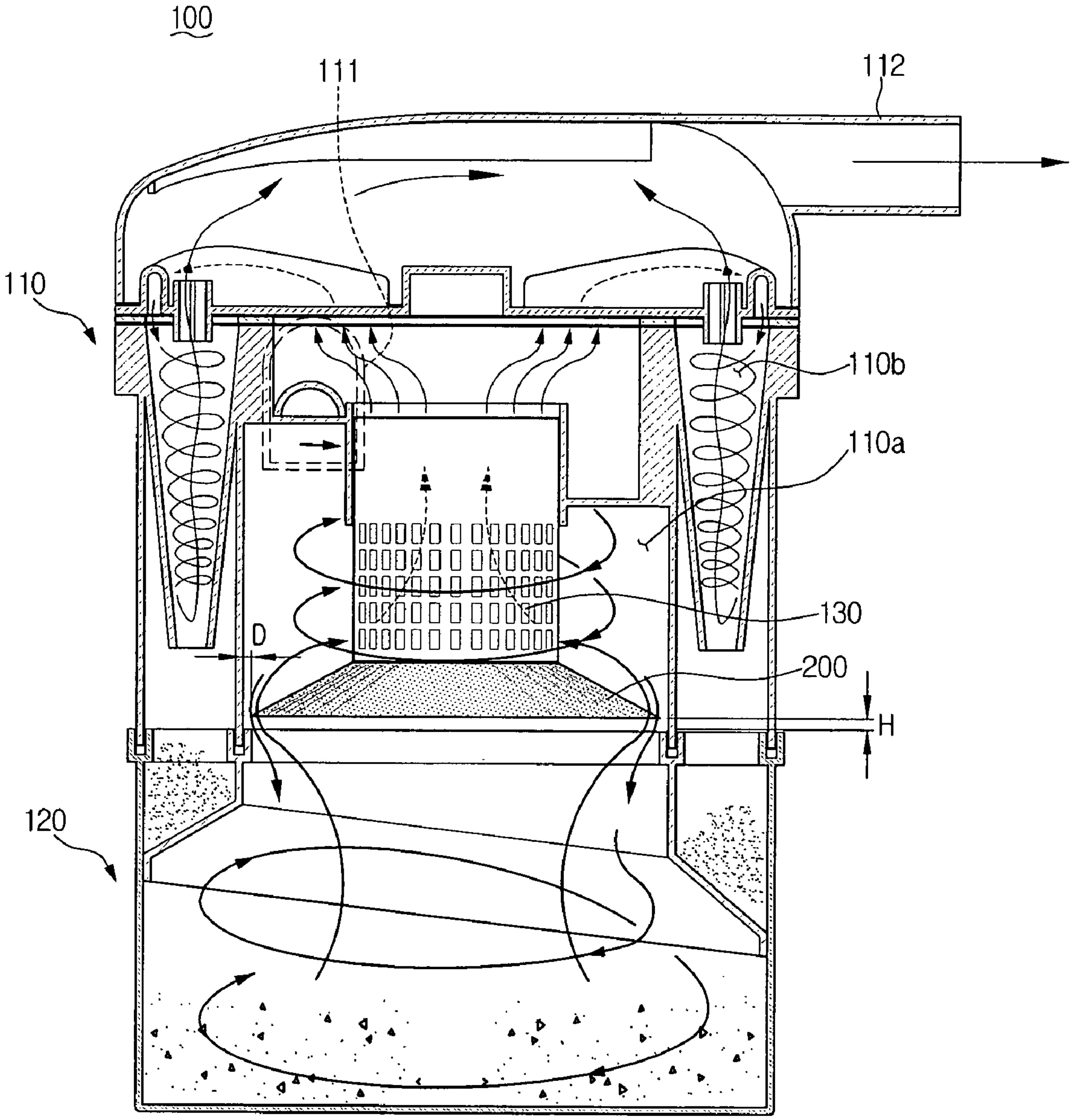
FIG. 2 is a cross-sectional view of a cyclone dust collecting apparatus according to a preferred embodiment of the present invention.

FIG. 2 is a cross-sectional view showing a preferred embodiment of dust collecting apparatus 100 applying a contaminants counterflow prevention member. As shown in FIG. 2, the cyclone dust collecting apparatus 100 comprises a cyclone body 110, a contaminants collection receptacle 120, a grill 130 and a contaminants counterflow prevention member 200.

The cyclone body 110 comprises a first cyclone chamber 110*a* that filters, i.e., separates large contaminants by centrifugal force. The cyclone body 110 also comprises a plurality of second or secondary cyclone chambers 110*b* that filter smaller, minute dusts from the air that has passed through the first cyclone chamber 110*a*. In the preferred embodiment, the first cyclone chamber 110*a* is substantially circular with a substantially circular inner circumference. Alternate and equivalent embodiments include a first cyclone chamber 110*a* having an inner circumference that is slightly out-of-round or slightly elliptical but with a correspondingly-shaped inner circumference. As is known, air drawn through a cyclone chamber forms a vortex or swirling motion, in the process, flowing over the interior circumference of the cyclone chamber. Since a vortex is inherently circular, deviations of the cyclone chamber's shape from being circular or round to slightly out-of-round or elliptical are usable, deviations of the circumference from being circular will adversely affect the formation of a cyclone or vortex.

The first cyclone chamber 110*a* has an air inlet port 111 through which contaminants-laden air is drawn in from a vacuum cleaner tool or brush that contacts or runs over a surface to be cleaned. The first cyclone chamber 110*a* also has an air discharge port 112 at an upper portion of the cyclone body 110 to discharge air exhausted from the second cyclone chamber 110*b* to a cleaner body (not shown).

The contaminants collection receptacle 120 is detachably mounted to a bottom portion of the cyclone body 110 and partitioned to collect contaminants collected from the first cyclone chamber 110*a* and the second cyclone chamber 110*b* respectively.

Figure 3:
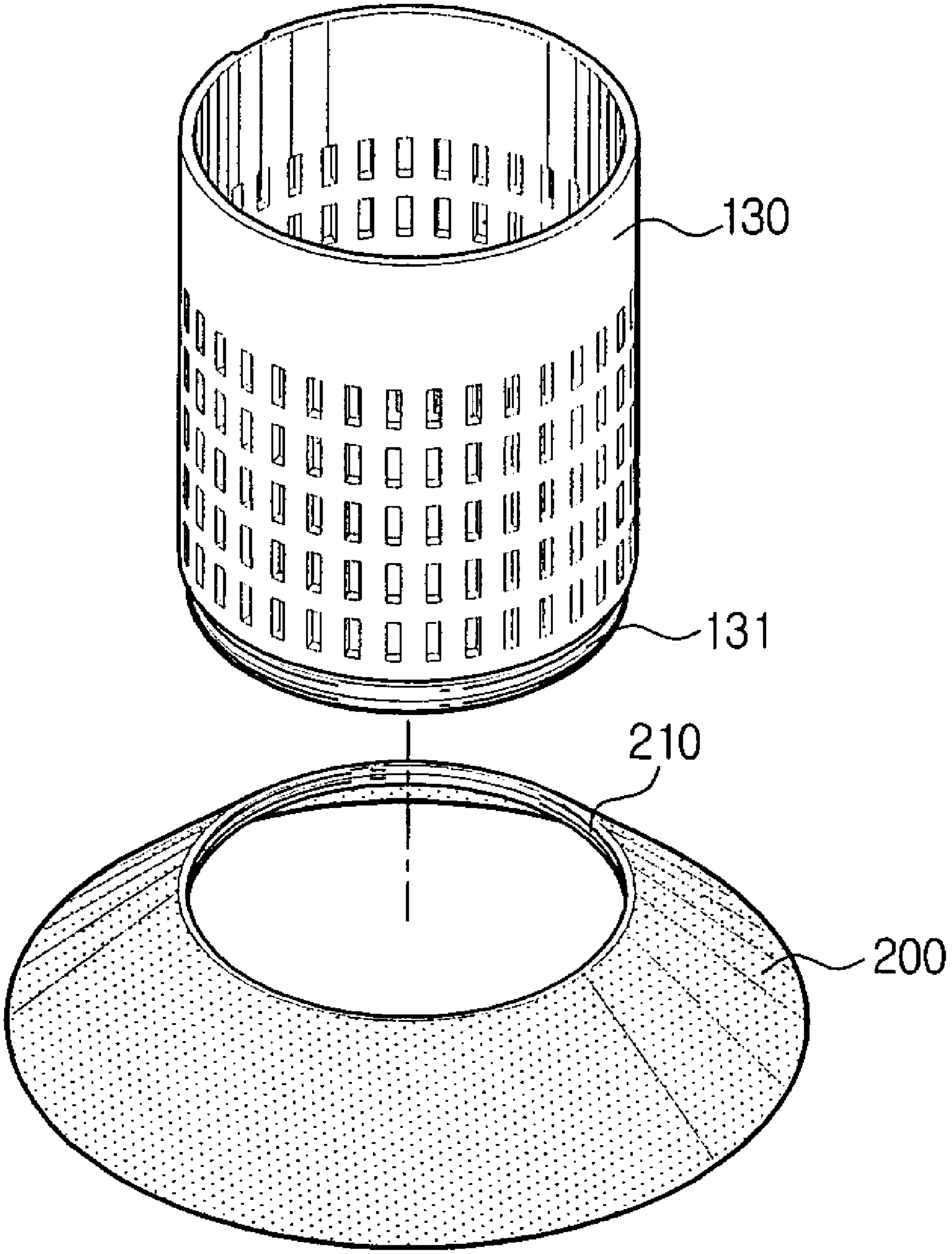
FIG. 3 is an exploded perspective view of a grill applying a contaminants counterflow prevention member.

A grill 130 is provided in the first cyclone chamber 110*a* to block large contaminants centrifugally separated in the first cyclone chamber 110*a* from flowing into a second cyclone chamber 110*b*. As shown in FIG. 3, a protrusion part 131 at a lower end of the grill 130, and a groove part 210 is configured at a position corresponding to the protrusion part 131 around the contaminants counterflow prevention member 200 such that the contaminants counterflow prevention member 200 fitted or attached to the lower end of the grill 130.

In the preferred embodiment, the contaminants counterflow prevention member 200 can be connected with the lower end of the grill 130 by a snap or interference fit, wherein the outside diameter of the protrusion part 131 of the lower end of the grill 130 is slightly larger than the inside diameter of the groove part 210 by an amount sufficient to allow the two parts to be mechanically forced together such that they do not separate. Since the counterflow prevention member is made of a pliable yet resilient material, its resilience tends to keep it engage to a protrusion part 131 that is slightly larger than its inside diameter.

In alternate embodiments, the groove part 210 of the counterflow protection member 200 is threaded and the protrusion part 131 of the lower end of the grill 130 is also threaded such that the groove part 210 of the protection member 200 can be threaded onto the protrusion part 131. In one other alternate embodiment, the pliable/resilient counterflow prevention member 200 has a rigid insert that is readily threaded. In yet another embodiment, the groove part 210 loosely engages the protrusion part 131 and the two parts are held together by an adhesive. In embodiments where the two parts are of suitable plastic materials, the protrusion part 131 can be ultrasonically welded to the groove part 210 can be ultrasonically welded, if both of them are at least faced with appropriate materials.

The contaminants counterflow prevention member 200 is mounted to a bottom portion of the grill 130 to be as close as possible to the inner circumference of the cyclone body 110 as shown in FIG. 2 yet allow an adequate flow of air to flow through the gap corresponding to the separation distance between them so that the formation of a vortex or cyclonic air flow through the cyclone body 110 is not impeded. The distance D separating the bottom portion of the grill and the inner circumference of the cyclone body 110 is preferably as small as possible because the collected contaminants are scattered by an ascending air stream and the collection of contaminants may decrease if the distance D between the contaminants counterflow prevention member 200 and the cyclone body 110 is too great. If the distance D is too short, however, the end of the contaminants counterflow prevention member 200 and the cyclone body 110 may interfere with each other to obstruct the generation of a rotating stream. Therefore, the distance D has to be kept greater than a certain minimum distance.

According to a preferred embodiment of the present invention, dust collection is optimized when the distance D between the contaminants counterflow prevention member 200 and the cyclone body 110 is approximately 10 to 12 mm, and the height H of the contaminants counterflow prevention member 200 from the contaminants collection receptacle 120 is approximately 8 to 10 mm.

In the preferred embodiment, the contaminants counterflow prevention member 200 is made of an elastically transformable material such as a relatively hard rubber of 40 Shore hardness degrees (40 A) and below so to be elastically transformed when large contaminants flowing into the contaminants receptacle 120 from the cyclone body 110 collide with it and returned to original status after large contaminants pass through it. Accordingly, the counterflow prevention member 200 should be sufficiently pliable so that it will deform or bend to allow large objects, such as the large object "A" shown in FIG. 4 to pass into the contaminants collection receptacle 120 when such objects are subjected to the vacuum force supplied by the vacuum cleaner, yet retain its shape in normal operation.

Hereinafter, operation of a cyclone dust collecting apparatus according to an embodiment of the present invention will be explained with reference to the accompanying drawings.

In operation, contaminants-laden air flows into the cyclone dust collecting apparatus 100 via a suction brush (not shown). The contaminants-laden air that flows into the cyclone dust collecting apparatus 100 flows into the first cyclone chamber 110*a* and forms a rotating stream in a direction of arrows depicted in FIGS. 2 and 4 to separate large contaminants. The air then flows into the second cyclone chamber 110*b* after it flows through the grill 130. Minute dusts that were not separated-out in the first cyclone chamber 110*a* are separated out in the second cyclone chamber 110*b* and then discharged to the outside of the cyclone dust collecting apparatus 100.

Figure 4:
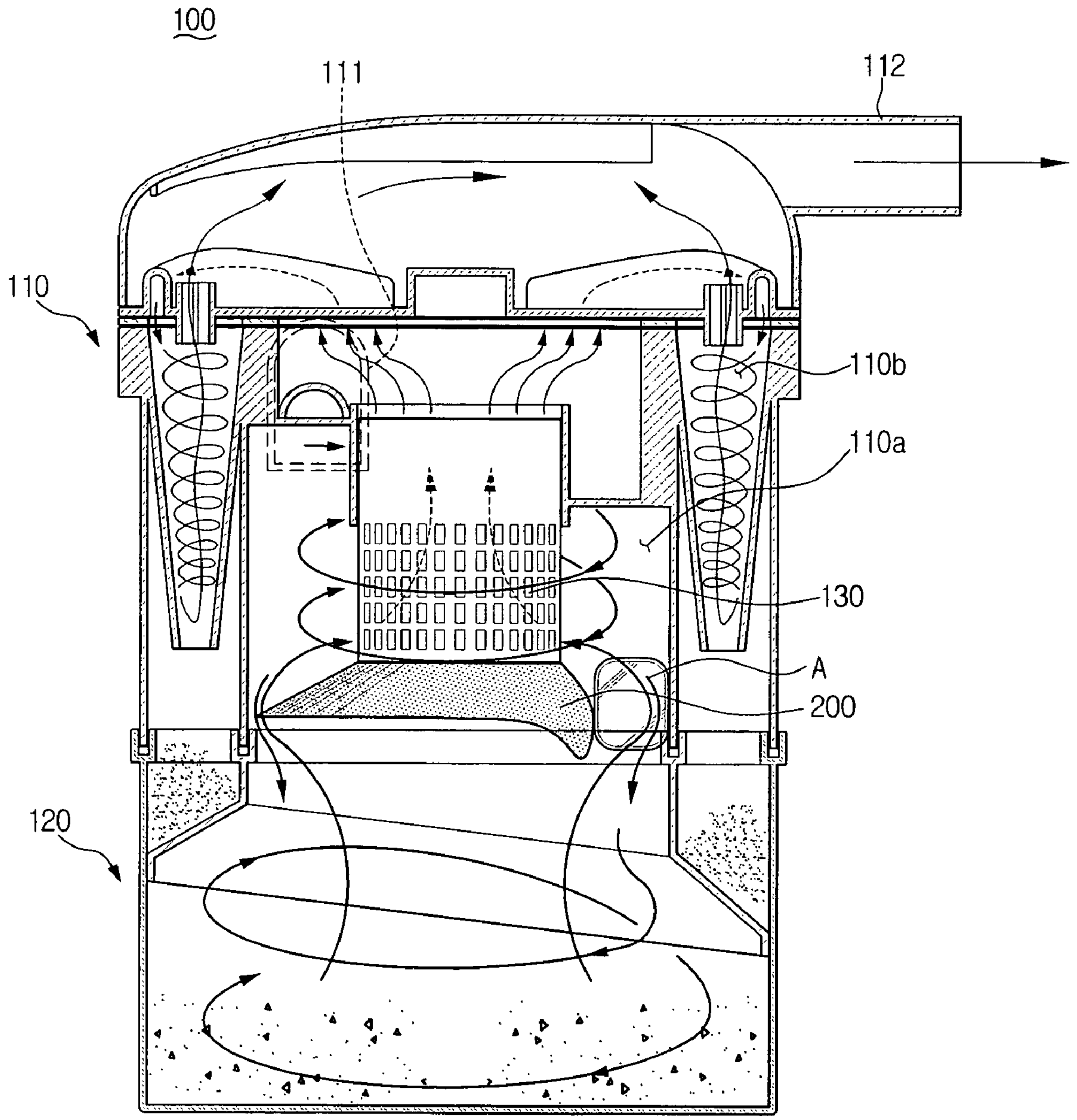
FIG. 4 is a view showing acting status of a cyclone dust collecting apparatus according to an embodiment of the present invention.

If a contaminant "A" (See FIG. 4.) such as bottle lid, larger than the separation distance D between the contaminants counterflow prevention member 200 and the cyclone body 110, flow into the cyclone dust collecting apparatus 100, the large contaminant "A" will fall towards the bottom surface of the contaminants collection receptacle 120 under the influence of rotating streams formed in directions of arrows in FIG. 4 as well as gravity. Because the contaminants counterflow prevention member 200 is made of elastically transformable material that is sufficiently pliable so as to bend or deform by an amount that is sufficient to allow large contaminants to deform the counterflow prevention member 200 by the force exerted on the large contaminant by the vacuum source. A large contaminant A can thereby be drawn into the contaminants collection receptacle 120 by the force exerted on it by the vacuum source that draws air through the cyclone dust collection apparatus. When a large contaminant A flows into the contaminants collection receptacle 120, the material from which the contaminant counterflow prevention member 200 is made is sufficiently resilient by which the form of the contaminants counterflow prevention member 200 returns to its initial state. Although contaminants collected in the contaminants collection receptacle 120 scatter due to ascending streams formed in direction of arrows in FIGS. 2 and 4, it prevents contaminants from colliding with the contaminants counterflow prevention member 200 to inflow into the grill 130.

Those of ordinary skill in the art will recognize that while the present invention has been explained with reference to multi cyclone dust collecting apparatuses depicted in FIGS. 2 and 4, the invention disclosed and claimed herein can be readily applied to signle-stage cyclone dust collecting/separating apparatus.

Although larger contaminants than distance between contaminants counterflow prevention member and the cyclone body flow into the cyclone dust collecting apparatus 100, the large contaminants can not be held by the contaminants counterflow prevention member 200 to be collected in the contaminants collection receptacle 120 because the contaminants counterflow prevention member 200 is made of an elastic transformable material such as rubber.

While the invention has been shown and described with reference to certain embodiments thereof, it will be understood by those skilled in the art that various changes in form and details may be made therein without departing from the spirit and scope of the invention, which is defined by the appended claims.

What is claimed is:

1. A cyclone dust collecting apparatus comprising:

a cyclone body having an inner circumference;

a grill mounted in the cyclone body and preventing dusts and contaminants centrifugally separated in a rotating stream from leaking out of the cyclone body;

a contaminants counterflow prevention member formed of an elastically transformable material and engaged with a bottom end of the grill, and preventing the centrifugally separated contaminants from counterflowing; and a contaminants collection receptacle removably attached to the cyclone body collecting the centrifugally separated contaminants from air passing through the cyclone body.

2. The cyclone dust collecting apparatus according to claim 1, wherein the contaminants counterflow prevention member is made of a rubber material of 40 Shore hardness degrees (40 A) and below.

3. The cyclone dust collecting apparatus according to claim 1, wherein the separation distance between the contaminants counterflow prevention member and the inner circumference of the cyclone body is 10 through 12 mm.

4. The cyclone dust collecting apparatus according to claim 1, wherein the separation distance between the contaminants counterflow prevention member and the contaminants collection receptacle is 8 through 10 mm.

5. The cyclone dust collecting apparatus according to claim 1, wherein a protrusion part is configured at a lower end part of the grill with which the contaminants counterflow prevention member is engaged, and a groove part is configured at a position corresponding to the protrusion part around the contaminants counterflow prevention member such that the groove part and the protrusion part are engaged with each other of the contaminants counterflow prevention member to be fit in the grill.

6. The cyclone dust collecting apparatus according to claim 1, wherein the contaminants counterflow prevention member is made of a material, sufficiently pliable to allow objects greater in size than the separation distance between the contaminants counterflow prevention member and the inner circumference of the cyclone body, to deform the material and pass around the counterflow prevention member by being pulled there through by air current drawn through the cyclone dust collecting apparatus by a vacuum source coupled to the cyclone dust collecting apparatus.

* * * * *